Jan. 20, 1925.  1,523,959
B. M. W. HANSON
WORK REST FOR METAL WORKING MACHINES
Original Filed June 15, 1921
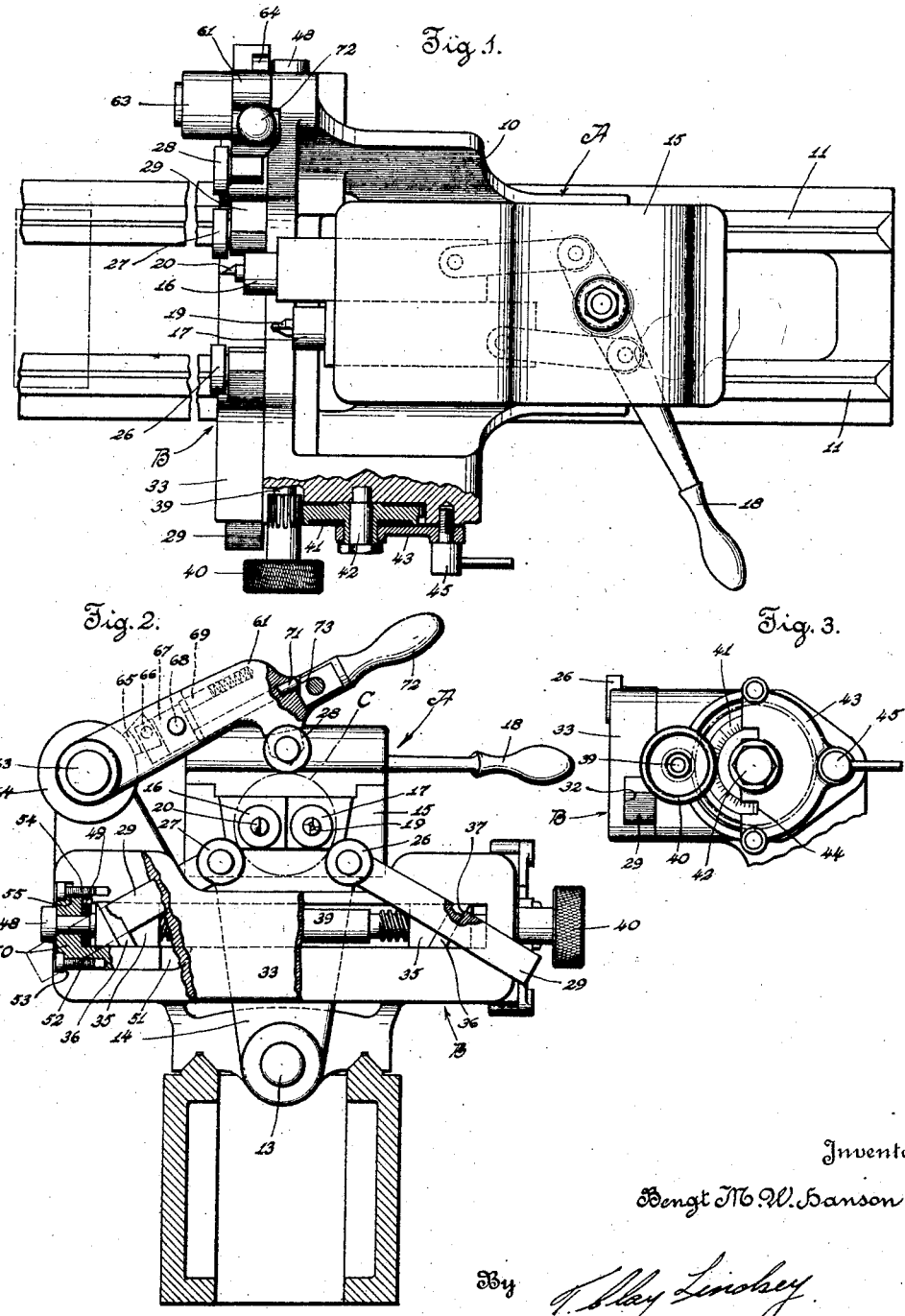
Inventor
Bengt M. W. Hanson
By T. Clay Lindsey
His Attorney Patented Jan. 20, 1925.

1,523,959

UNITED STATES PATENT OFFICE.

BENGT M. W. HANSON, OF HARTFORD, CONNECTICUT.

WORK REST FOR METAL-WORKING MACHINES.

Original application filed June 15, 1921, Serial No. 477,660. Divided and this application filed April 30, 1923. Serial No. 635,547.

*To all whom it may concern:*

Be it known that I, BENGT M. W. HANSON, a citizen of the United States, and a resident of Hartford, in the county of Hartford and State of Connecticut, have invented certain new and useful Improvements in Work Rest for Metal-Working Machines, of which the following is a specification.

This invention relates to improvements in metal working machines, and more particularly to work rests for use in connection therewith.

An object of this invention is to provide an improved form of work rest which is efficient in operation and which may be accurately adjusted.

Another object of the invention is to provide an improved form of work rest which may be adjusted with precision to a predetermined position before the work is placed in the machine.

Another object of the invention is to provide a work rest which is adapted to hold the work firmly in position and to permit quick and easy withdrawal of the work therefrom when desired.

This is a division of my co-pending application Serial No. 477,660, filed June 15, 1921, wherein there is fully described a machine in combination with which this work rest is particularly well adapted to be used. It is understood, however, that the work rest herein described may be employed in any suitable machine, and in any suitable part thereof.

Other objects and advantages will be in part obvious, and in part pointed out hereinafter.

In the drawing forming a part of the specification and in which similar reference characters refer to similar parts, Figure 1 shows a plan view of a tail stock equipped with a work rest constructed in accordance with the practice of my invention, certain of the parts being broken away to more clearly show the arrangement of certain of the parts;

Fig. 2 is a front view of the construction shown in Fig. 1, and illustrates the manner in which the work supporting members are moved forward and backward to and from their work supporting positions, and the means by which they are centrally adjusted. Another part shown in this figure is a work supporting member which may be moved in and out of its supporting position and which may be automatically locked in any desired position; and Fig. 3 is a front view of the actuating knob or hand wheel by which the work rest is adjusted, and its associated indicating dial by means of which it is possible to very accurately adjust the work rest to a predetermined position.

Referring to the drawing, and more particularly to Figures 1 and 2, there is shown a tail stock A for a centering or similar metal working machine, upon the forward face of which are mounted the parts forming a work rest B, adapted to steady the work. The tail stock A is more particularly adapted for use in centering pieces of work, and is more completely described in the co-pending application above referred to. The tail stock has a carriage 10 which is slidable back and forth on the ways 11 which may be mounted on the bed of a lathe or other suitable machine. It is to be understood that there is provided on the other end of the bed a rotatable work holding device or chuck, not here illustrated, as the particular construction thereof is immaterial. Mounted on this carriage is a horizontally disposed shaft 13 on which the legs 14 of a tool support 15 are journaled. On the tool support 15 are mounted a pair of tool holders 16 and 17 which may be reciprocated longitudinally by means of a lever 18 in order to bring them into position for operating on the work. The tool supported by the holders 16 and 17 are here shown as a center drill 19 and a shaving tool 20. These tools, in addition to being reciprocated back and forth, may be swung with the tool support 15 about the shaft 13 so as to center them with respect to the work when they are moved into operating position.

When a piece of work, as, for instance, a round bar, indicated in Fig. 2 by the broken line at C, is placed in a machine for centering by the tools 19 and 20, it is usually desirable that it be supported by some means which will keep it from being pressed out of alinement either by gravity or by any other strain, and for this purpose there is provided on the front edge of the carriage 10 the work rest B which comprises a number of rollers as, for instance, the three equi-distantly spaced rollers 26, 27, and 28, rigidly supported by suitable means. In order to accommodate the bar C, which may be of any diameter within certain limits, these rollers 26, 27, and 28, are adjustable, and, preferably, I make them movable in a radial direction toward and away from the center of the work. To this end the lower rollers 26 and 27, which may be entirely similar, are each mounted on a slide 29 which travels longitudinally in a slot 32 in the plate 33 of the carriage 10. The slots 32 extend radially toward the center of the work so as to permit the radial movement of the rollers 26 and 27 toward each other, as above described. Each of the slides 29 is associated with a nut 35 through the medium of a rib 36 on the nut, which is slidable in a corresponding groove 37 in the slide. The nuts 35 are each provided with an internal thread of similar lead but of opposite direction, that is to say, one is right hand and the other left hand. A spindle 39, which is journaled in the carriage 10, is screw threaded to engage the nuts 35 so that upon rotation of the spindle in one direction the nuts will be drawn toward each other, and upon rotation of the spindle in the other direction they are moved apart. Correspondingly, as the nuts 35 approach each other, they push the rollers 26 and 27, through the medium of the slides 29, in a direction radially of the work, and upon separation of the nuts the rollers are withdrawn in the opposite direction.

The spindle 39 is rotatable by hand by means of a knob 40 at one end of the spindle, and the amount of such rotation is indicated by a dial 41 journaled on a pin 42 and in geared relation with the spindle. The dial 41 may be graduated in any desired manner. The plate 43 partly covers the dial 41 and provides an index mark 44 to be used in conjunction with the graduations of the dial 41.

As a means for holding the spindle 40 against rotation and consequently holding the work supporting rollers 26 and 27 rigidly in any predetermined position, there is provided a locking screw 45 which clamps the plate 43 against the edge of the dial 41. It will be seen that when the spindle 39 is rotated to adjust the rollers 26 and 27, the extent of rotation will be precisely indicated by the dial 41 and thus the work rest rollers may be very accurately positioned in accordance with the diameter of the work so that when the work is thereafter placed on these adjusted rollers its axis will be in precise alinement with the axis of the chuck and in proper relation to the tools as they are fed up to the work.

For the purpose of longitudinally adjusting the hand operated spindle 39 so that in any vertical position of adjustment of the work rest rollers, these rollers will be symmetrically spaced with respect to the axis of rotation of the work, there is provided a pair of spaced collars 48 and 49 fixed to the rear end of the spindle 39, and between these collars is interposed a member 50 mounted for adjustment in a recess 51 in the carriage 10. Carried by the member 50 is a screw 52, the head of which abuts against a shoulder 53 on the carriage. Threaded into the carriage is a screw 54, the head of which engages an abutment 55 on the member 50. Now, if the spindle 39 is to be adjusted to the right (Fig. 2), the screw 52 is loosened and the screw 54 is screwed up until it has moved the member 50 and the spindle 39 to the proper extent, and then the screw 52 is screwed home to hold the spindle against movement in the opposite direction. If it is necessary to adjust the spindle to the left, the screw 54 is loosened, the screw 52 is screwed further into the member 50 to draw the same toward the left, and then the screw 54 is tightened up.

For the purpose of securely holding the work against vibration while at the same time permitting ready positioning and removal of the work from the rest rollers 26 and 27, there is provided the work holding lever 61. This lever carries the roller 28 adapted to rest on the top of the work. The lever 61 is pivoted as at 63 on the carriage 10 and concentrically of this pivot is a fixed disk 64 with the periphery of which cooperates a friction shoe 65 pivoted as at 66 to a block 67 which, in turn, is pivoted as at 68 to the lever 61. The pivots of the shoe 65 and the block 67 are so arranged that these members constitute a toggle joint. A spring pressed plunger 69 carried by the lever 61 normally tends to turn the block 67 in a direction to engage the shoe with the disk 64. Slidably mounted in the lever 61 and engaging at one end with the block 67 is a pin 71. This pin is adapted to be pressed in a longitudinal direction by a handle 72 having a cam edge 73 which is arranged to bear against the end of the pin 71 when the handle 72 is lifted. It will be understood that when the lever 61 is pulled down into operative position, that is to say, with the roller 28 bearing against the work, the plunger 69 will turn the block 67 in a direction to frictionally engage the shoe with the disk 64. The vibration of the work cannot then raise the roller 28, for this force, tending to raise the lever 61, wedges the shoe 65 more tightly against the disk 64. When it is desired to raise the lever 61 to permit of removal of the work, the handle is swung upwardly on its own pivot causing the cam edge 73 to press against the pin 71 thereby releasing the shoe from the disk 64 and the lever 61 may now be swung freely into the upright position shown in Fig. 1.

Thus, by the above construction, are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What I claim is:—

1. In a metal working machine, an adjustable work rest, a hand operated spindle for adjusting the same, means for measuring the arc of movement of said spindle and including a scale element and an indicating element, one of said elements being rotated by said spindle, and means for clamping said rotating element and spindle in adjusted position.

2. In a metal working machine, an adjustable work rest, a hand operated spindle for adjusting the same, a dial carrying member operatively connected so as to rotate with said spindle, a plate over said member and having an indicating mark cooperating with said dial, and means for flexing said plate to lock said dial carrying member and spindle in adjusted position.

3. In a metal working machine, a work rest including a frame, a pair of slides mounted therein for adjustment in fixed converging paths, a work supporting roller carried by each slide, and common means for simultaneously adjusting said slides.

4. In a metal working machine, a work rest including a frame, a pair of slides mounted therein for movement on converging lines and adapted to support a piece of work therebetween, a pair of travelling nuts on said frame, a spindle having right and left hand threaded portions in respective engagement with said nuts, and connections between the nuts and slides for moving the latter at an angle to the axis of the spindle when the latter is turned.

5. In a metal working machine, a work rest including a pair of work supporting members slidably mounted therein, a pair of nuts slidably mounted in said frame, tongue and groove connections between said nuts and supporting members, and means for simultaneonsly moving said nuts in opposite directions.

6. In a metal working machine, a work rest including a frame, a pair of work supporting members slidably mounted therein, a pair of traveling nuts in said frame, inclined tongue and groove connections between said nuts and members, and a hand operated spindle having right and left hand threaded portions in respective engagement with said nuts.

7. In a metal working machine, a work rest including a frame, a plurality of work supporting members mounted for adjustment therein, a hand operated spindle journaled in said frame, means between said spindle and members whereby the latter are adjusted in unison upon rotation of said spindle, and means for longitudinally adjusting said spindle.

8. In a metal working machine, a frame, a plurality of work supporting members mounted for adjustment therein, a hand operated spindle journaled in said frame, connections between said spindle and members whereby the latter are adjusted in unison upon rotation of said spindle; and means for longitudinally adjusting said spindle comprising a member slidably mounted in said frame and fixed against longitudinal movement relative to said spindle, a screw threaded in said member, an abutment on said frame against which the head of said screw engages, a screw threaded into said frame, and an abutment on said member against which the head of said second mentioned screw engages.

9. In a metal working mechine, a frame, a pair of slides mounted for adjustment therein, a pair of traveling nuts in said frame, connections between said nuts and slides whereby the latter are moved when the nuts are adjusted, a hand operated spindle having right and left hand screw threaded portions in threaded engagement with the respective nuts, and means for longitudinally adjusting said spindle.

10. In a metal working machine, a work rest including a frame, a pair of work supporting members therein mounted for adjustment on converging lines, a hand operated spindle journaled in said frame, traveling nuts associated with said spindle, connections between said nuts and members; and means for measuring the arc of rotation of said spindle including a scale element and an indicating element, one of said elements being stationary and the other being rotatably connected with said spindle.

11. In a metal working machine, a work rest including a frame, a pair of work supporting members mounted for adjustment therein, a hand operated spindle journalled in said frame, travelling nuts associated with said spindle, connections between said nuts and members, means for measuring the arc of rotation of said spindle including a scale element and an indicating element, one of said elements being stationary and the other being rotatably connected with said spindle, and means for clamping said rotating element and spindle in adjusted position.

12. In a metal working machine, a rest for rotatably supporting a piece of work, and means for holding the work against said rest including a pivoted lever, a roller carried thereby for movement with the work, means for locking said lever in position with said roller engaging the work, and a handle carried by said lever and controlling said locking means.

13. In a metal working machine, a rest for rotatably supporting a piece of work, and means for holding the work against said rest including a pivoted lever, a roller on said lever adapted to engage the work to permit the lever to be swung out of operative position, a friction brake associated with said lever and adapted to lock the same in position with said roller engaging the work, and means for releasing the brake to permit the lever to be thrown to inoperative position.

14. In a metal working machine, a rest for rotatably supporting a piece of work, and means for holding the work against said rest including a pivoted lever, a friction member permitting the lever to be thrown into operative position and adapted to automatically lock said lever in operative position, and a handle pivoted to said lever and adapted to release said friction member when the handle is moved in a direction to throw the lever into inoperative position.

15. In a metal working machine, a rest for rotatably supporting a piece of work, and means for holding the work against said rest including a pivoted lever, a roller carried by said lever for engagement with the work, a fixed disk, a shoe carried by the lever, means normally urging said shoe into engagement with said disk, a handle carried by said lever, and means between said handle and shoe for withdrawing the latter from said disk when said handle is raised.

16. In a metal working machine, a rest for rotatably supporting a piece of work; and means for holding said work against movement on said rest and including a pivoted lever, a roller carried by said lever for engagement with the work, a fixed disk concentric to the pivotal point of said lever, a block pivoted to said lever, a shoe pivoted to said block, means for normally urging said block in a direction to engage said shoe with said disk, a slidable pin in said lever engaging said block, and a handle pivoted to said lever having a cam engaging said pin to withdraw said shoe from said disk when said handle is raised.

BENGT M. W. HANSON.